3,681,024
METHOD FOR PRODUCTION OF SULFUR FROM HYDROGEN SULFIDE USING OXYGEN

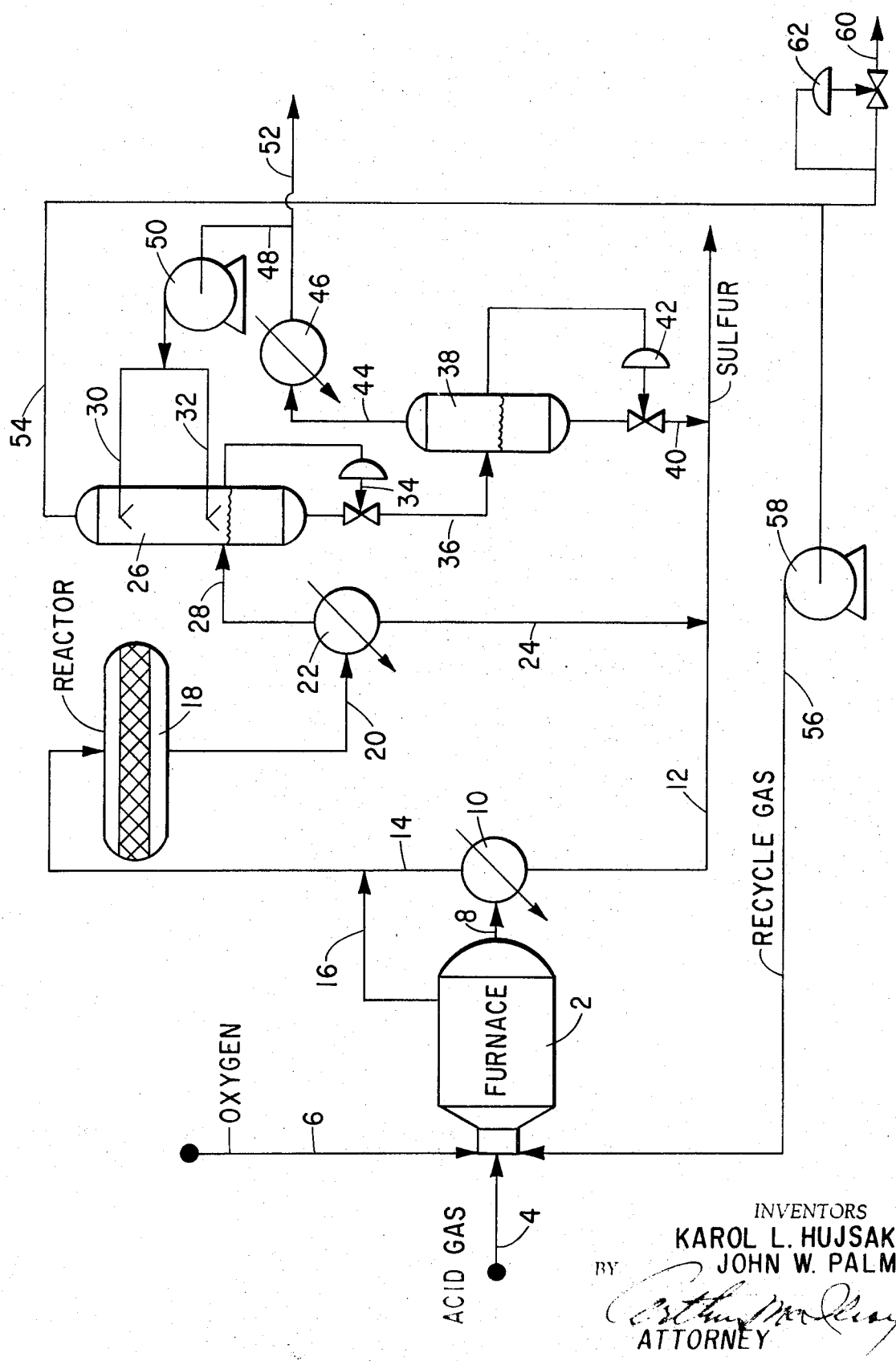

Karol L. Hujsak and John W. Palm, Tulsa, Okla., assignors to Amoco Production Company, Tulsa, Okla.
Continuation of application Ser. No. 724,949, Apr. 29, 1968. This application Aug. 10, 1970, Ser. No. 62,690
Int. Cl. C01b 17/04
U.S. Cl. 23—225 P          7 Claims

ABSTRACT OF THE DISCLOSURE

The volume of sulfur plant effluent discharged to the atmosphere is materially decreased by the use of substantially pure oxygen rather than air down stream from the reactor(s). The uncondensed fraction separated from the product sulfur is subjected to a condensing or quenching step where any free sulfur vapors present in such fraction are removed from the system. The portion of the fraction which remains uncondensed is split into two streams, the larger one of which is recycled to the furnace, and the smaller one purged to the atmosphere.

---

This application is a continuation of Ser. No. 724,949, filed Apr. 29, 1968, and now abandoned.

INTRODUCTION

The present invention relates to the recovery of sulfur from hydrogen sulfide-containing gases. More particularly, it is concerned with the production of additional elemental sulfur from the effluent stream of a Claus type sulfur recovery plant by means of a corresponding reduction in acidic components in the effluent therefrom while simultaneously bringing about a reduction in the volume of gas normally present in such effluent streams.

BACKGROUND OF THE INVENTION

In the conventional Claus sulfur recovery plant, the effluent therefrom generally contains approximately 6 to 9 percent of the sulfur present in the plant feed. This effluent gas is either vented directly or sent to an incinerator to convert hydrogen sulfide to sulfur dioxide which is then dispersed into the atmosphere at a relatively high level by means of a stack. Some of these stacks range in height from about 300 to about 700 feet. This means of handling such a disposal problem is undesirable because the atmosphere is polluted and the required facilities are costly. For example, in the case of a 500 or 600 tons/day sulfur plant, an incinerator stack of the order of 500 feet in height is required, costing approximately one-half million dollars. Moreover, the cost of operating facilities of this kind is substantial. Even with such disposal equipment, the maximum limits on the amount of sulfur dioxide that can be discharged to the atmosphere are often set by regulatory bodies which may result in restriction of maximum sulfur production. In the recent past this problem has become much more acute, particularly in the more densely populated areas of the country.

BRIEF DESCRIPTION OF THE INVENTION

We have now discovered that the conversion level of a Claus sulfur recovery unit can be significantly increased by using oxygen enriched air or substantially pure oxygen to reduce the throughput of inerts—primarily nitrogen. The air which is a conventional plant is supplied to the furnace to burn one-third of the hydrogen sulfide, is replaced preferably by oxygen of about 95% purity. Plant effluent from a one or two reactor unit is sent to a water scrubber to reduce the water content of the effluent, and a sufficient amount of the scrubber off-gas is recycled to dilute the oxygen feed so that furnace conditions are essentially equivalent to operation with air. In a three reactor plant, the water scrubbing step is carried out between the second and third reactors. The water scrubber off-gas not recycled to the furnace is sent to the third reactor. In the process of our invention the total volume of off-gas amounts to only about one-fifth or less of the tail gas from a conventional sulfur plant, using air. The improved sulfur recovery resulting from the recycle and reduction of the volume of tail gas corresponds to removal of 95% of the sulfur from conventional plant tail gas.

DETAILED DESCRIPTION OF THE INVENTION AND DRAWING

The process of our invention is further illustrated by reference to the accompanying drawing in which an acid gas, i.e., hydrogen sulfide or a mixture of hydrogen sulfide and not more than about 60% carbon dioxide, is introduced to a burner in furnace 2 through line 4. Carbon dioxide if present in the acid gas feed may if desired be removed prior to introduction to the furnace by means of low temperature fractionation or other suitable methods. The presence of carbon dioxide in the feed, although it tends to help control the temperature in the furnace, does increase the purge gas rate and the loss of sulfur compounds from the system. Oxygen in an amount corresponding to about one-half the volume of hydrogen sulfide fed to the burner is added to the burner through line 6. Tonnage oxygen can be readily produced by modern methods in 95% purity and at a relatively low cost.

In furnace 2 approximately 60 to 70% of the recoverable sulfur is formed non-catalytically. Effluent from the furnace is taken through line 8 at a temperature of about 1200° F. and run into condenser 10 where it is cooled to about 375° F. Liquid sulfur formed during this cooling step is removed from the system via main flow line 12 while the uncondensed fraction is withdrawn through line 14 and combined with sufficient 1200° F. gas in line 16 to bring the temperature of the resulting mixture to about 450° F. as it enters reactor 18. Although one catalytic reactor is shown, additional reactors could be used. However, they are smaller than those employed in conventional plants and may operate at higher (not above 650° F.) temperatures because the partial pressures of hydrogen sulfide, sulfur dioxide and sulfur are higher.

Hot product gas from reactor 18 is withdrawn through line 20 and cooled in condenser 22 to a temperature of 275° to 300° F. where additional sulfur in liquid form is taken through line 24 and combined with that in line 12. The uncondensed gas is transferred to water scrubber 26 through line 28 and contacted with liquid water entering through lines 30 and 32 at a temperature of from 105 to 150° F. The temperature at the top of water scrubber 26, which is preferably operated at a pressure of about 0–50 p.s.i., is less than the melting point of sulfur while the bottom of the scrubber is operated at a temperature of about 250° F. Thus the solid sulfur forming in the upper part of scrubber 26 passes on down to the bottom thereof where it becomes molten. While some of the sulfur converted to the solid form is present in the gaseous stream flowing into the bottom of scrubber 26 through line 28, reaction between hydrogen sulfide and sulfur dioxide in the presence of water occurs to some extent within the scrubber to further convert sulfur into a form readily recoverable from the system and correspondingly reducing the amount thereof ultimately escaping to the atmosphere. Flow from the bottom of scrubber 26 is regulated by means of liquid level control 34. A mixture of liquid water and molten sulfur is withdrawn through valved line 36 and sent to separator vessel 38 from which the flow of sulfur is likewise regulated through valved line 40 by means of liquid level control 42. The sulfur in line 40 is combined with that in line 12 and recovered.

Overhead from separator 38 water is withdrawn through line 44, cooled to 105-150° F. in cooler 46 and a portion thereof sent through line 48 and pump 50 where the flow is then split into lines 30 and 32 for use in the scrubbing operation. The balance of the water stream coming off from cooler 46 is taken from the system via line 52. In this connection it should be pointed out that scrubber 26 may be operated at temperatures such that solid sulfur is removed from the bottom thereof in the form of an aqueous slurry and the sulfur separated therefrom by filtration or other suitable methods.

The cooling operation occurring in scrubber 26 results in the removal of water from the gas in line 28. Use of recycle at this point increases the conversion to free sulfur since volatile sulfur compounds such as carbon disulfide and carbonyl sulfide can be recycled to the furnace via lines 54, 56 and pump 58. By recycling these gases to the furnace it is possible to use the optimum concentration of reactants in furnace 2. This is for the reason that the recycled gas serves to dilute the reactor in furnace 2 and prevent the occurrence of excessive temperatures that would otherwise be generated therein if only hydrogen sulfide and substantially pure oxygen were present. The gas in line 56 is returned to the furnace in a ratio of about 4 volumes for each volume of oxygen used where the purity of the oxygen is at least 95%. Where the oxygen purity is less than 95% the volume of recycled gas returned to the furnace will be correspondingly reduced. However, in no case should the oxygen purity in practicing the process of our invention be reduced to less than about 75%. The unreacted gas is withdrawn from the system by means of line 60 having back pressure control valve 62 which serves to maintain scrubber 26 at proper operating pressure.

From the foregoing description it will be apparent that by the process of our invention it is possible not only to increase the overall sulfur yield obtainable from a Claus plant but it is likewise evident that a material reduction in initial investment can be realized by minimizing the size of plant equipment such as reactors, condensers and the incinerator stack required to disperse objectionable gases into the atmosphere. While the flow diagram appearing in the accompanying drawing shows only the use of a single reactor it will be appreciated of course that the process of our invention is equally applicable to a multiple reactor unit, the point being that free sulfur can be recovered in the manner set forth in the effluent coming from either type of plant.

We claim:

1. In a method for the recovery of free sulfur from hydrogen sulfide-containing gas by means of the straight through process, the improvement which comprises
    (1) burning not more than about 1/3 of said hydrogen sulfide to sulfur dioxide in a combustion zone by the use of a mixture of substantially pure oxygen and recycled gas from step (8),
    (2) reacting the sulfur dioxide thus produced with the remaining hydrogen sulfide to form a mixture containing free sulfur, water and volatile sulfur compounds as well as unconverted components,
    (3) cooling said mixture to separate liquid sulfur therefrom,
    (4) subjecting the uncondensed portion of said mixture to a further cooling step by contacting said uncondensed portion in a scrubbing zone with water obtained from step (7) below,
    (5) removing a mixture of molten sulfur and liquid water from the bottom of said zone,
    (6) separating said liquid water from said mixture and rejecting a portion of said water from the system,
    (7) cooling the remainder of said liquid water to a temperature of from about 105° to about 150° F. and returning the water thus cooled to step (4) thus supplying the only water required by said improvement, whereby the upper portion of said zone is maintained below the melting point of sulfur,
    (8) withdrawing from the top of said zone a gas phase essentially free from sulfur vapors and substantially reduced in water content over that contained in said uncondensed portion, and
    (9) recycling a portion of the gas phase from step (8) to step (1), said recycled portion amounting to about 4 volumes for each volume of oxygen used in step (1).

2. The method of claim 1 wherein a portion of step (2) is effected in the presence of a catalyst for the reaction.

3. The method in claim 1 wherein the recycled portion in step 9 of the gas phase from step 8 is in a volume such that said hydrogen sulfide-containing gas contains not more than about 60% carbon dioxide.

4. The method of claim 1 wherein the water in the mixture of sulfur withdrawn from the bottom of said water scrubbing zone is separated from said molten sulfur, cooled and a portion thereof recycled to step 4.

5. The method of claim 1 wherein step 4 is effected by subjecting the remainder of said mixture to a water scrubbing operation at pressure and temperature conditions prevailing in the scrubbing zone such that solid sulfur is formed in the upper portion of said zone.

6. The method of claim 5 wherein said scrubbing operation is conducted in an essentially vertical zone with liquid sulfur collected in the bottom thereof.

7. The method of claim 1 wherein said hydrogen sulfide-containing gas contains not more than about 60% carbon dioxide.

References Cited

UNITED STATES PATENTS

| | | | |
|---|---|---|---|
| 1,941,623 | 1/1934 | Rosenstein | 23—226 |
| 2,389,810 | 11/1945 | Odell et al. | 23—225 |
| 2,413,714 | 1/1947 | Keeling | 23—225 |
| 2,760,848 | 8/1956 | Dunning | 23—225 |
| 3,331,733 | 7/1967 | Venemark | 23—225 X |
| 3,463,611 | 8/1969 | Haritatos et al. | |

OSCAR R. VERTIZ, Primary Examiner

G. O. PETERS, Assistant Examiner